Figure 1:
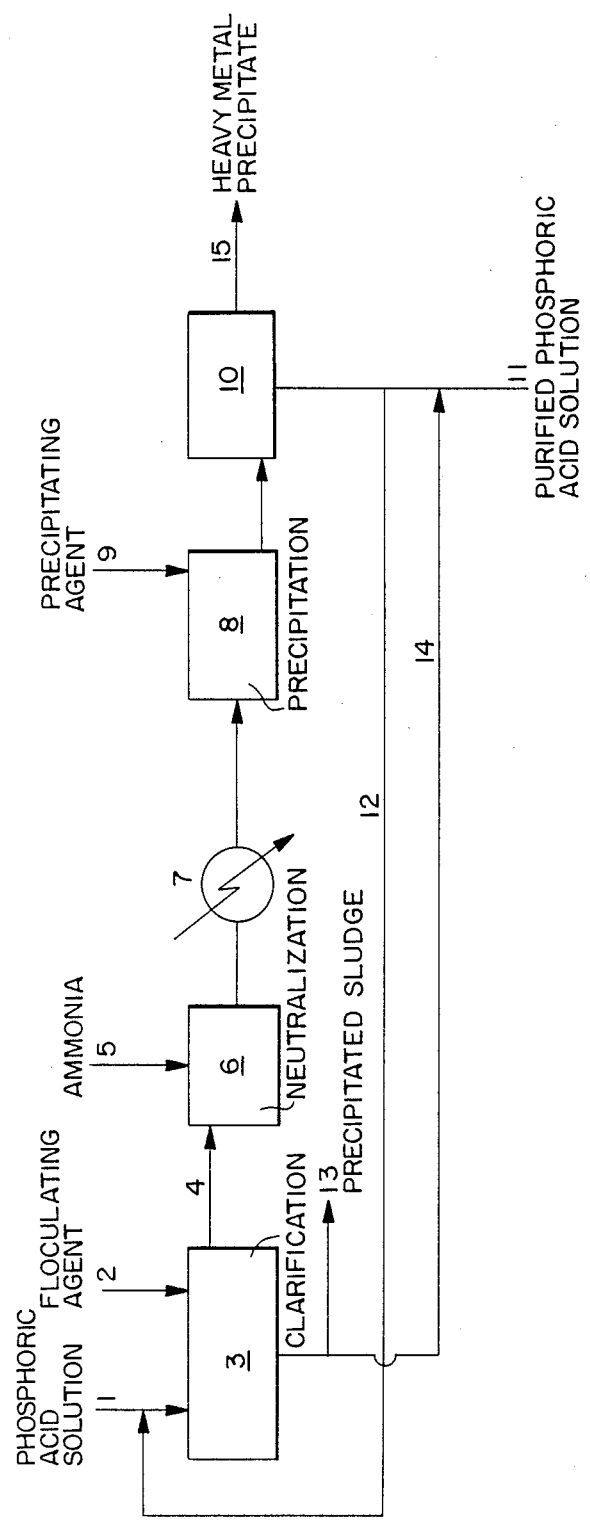

United States Patent [19]

Haraldsen

[11] Patent Number: 4,986,970
[45] Date of Patent: Jan. 22, 1991

[54] METHOD FOR REMOVAL OF HEAVY METALS, ESPECIALLY CADMIUM, FROM PHOSPHORIC ACID CONTAINING SOLUTIONS

[75] Inventor: Hans F. T. Haraldsen, Porsgrunn, Norway

[73] Assignee: Norsk Hydro a.s., Oslo, Norway

[21] Appl. No.: 435,363

[22] PCT Filed: Feb. 24, 1989

[86] PCT No.: PCT/NO89/00016
§ 371 Date: Nov. 3, 1989
§ 102(e) Date: Nov. 3, 1989

[87] PCT Pub. No.: WO89/08075
PCT Pub. Date: Sep. 8, 1989

[30] Foreign Application Priority Data

Mar. 4, 1988 [NO] Norway .................................. 880990

[51] Int. Cl.⁵ .......................................... C01B 25/234
[52] U.S. Cl. ................................................ 423/321 R
[58] Field of Search ..................... 423/321 R

[56] References Cited

U.S. PATENT DOCUMENTS

| | | | |
|---|---|---|---|
| 4,452,768 | 6/1984 | Gradl et al. | 423/321 R |
| 4,492,680 | 1/1985 | Frankenfeld et al. | 423/321 R |
| 4,503,016 | 3/1985 | Shimmel et al. | 423/321 R |
| 4,634,580 | 1/1987 | Jdid et al. | 423/321 R |
| 4,713,229 | 12/1987 | Schimmel et al. | 423/321 R |
| 4,806,323 | 2/1989 | Tjioe et al. | 423/321 R |

Primary Examiner—Wayne A. Langel
Attorney, Agent, or Firm—Wenderoth, Lind & Ponack

[57] ABSTRACT

The present invention relates to a method for removal of heavy metals, especially cadmium, from phosphoric acid containing solutions, primarily such solutions made by digestion of rock phosphate by nitric acid and subsequent removal of the main part of calcium from the mother liquor. The phosphoric acid solution is pre-purified for removal of sludge and insolubles and then partly neutralized with ammonia to pH 1.4–2 and cooled to 5°–40° C. Metal salts of dithio carbonic acid-O-esters are added for precipitating the heavy metals which then are separated from the solution. The solution is preferably neutralized to pH 1.6–1.8 and cooled to 10°–20° C. before precipitation of the heavy metals which then can be removed from the phosphoric acid solution by flotation and subsequent filtration.

6 Claims, 1 Drawing Sheet

METHOD FOR REMOVAL OF HEAVY METALS, ESPECIALLY CADMIUM, FROM PHOSPHORIC ACID CONTAINING SOLUTIONS

The present invention relates to a method for removal of heavy metals, especially cadmium, from phosphoric acid containing solutions, primarily such solutions which are made by digestion of rock phosphate with nitric acid and subsequent removal of the main parts of calcium from the mother liquor. The method comprises pre-purification of the phosphoric acid solution/mother liquor for removal of sludge and insoluble components and subsequent partial neutralization with ammonia.

In past years it has become increasingly important to remove heavy metals, and then especially cadmium, partly because of more strict environmental regulations, but also because the supply of high grade rock phosphate having a low content of heavy metals has decreased.

Several methods for solving this problem have been proposed and at which stage during the manufacture of phosphate fertilizer the purification shall be performed. These proposals comprise calcination of the rock phosphate, leaching, precipitation or extraction of the heavy metals. It is just not adequate to find methods for separating the heavy metals from the valuable components as the content of heavy metals is relatively low, and methods must be developed which in practice are technically feasible and in addition economically acceptable.

Among the methods which comprise precipitation, that one described in DE No. 31 34 847 can be mentioned. This method relates to precipitation of Cd as sulfide. The most essential disadvantage of this method is addition of poisonous $H_2S$ which creates large environmental problems in the production plant itself.

It is further known from the assignee's Norwegian application No. 86 4374 to remove Cd by co-precipitation with calcium at pH 2-7. The mother liquor is neutralized by ammonia at a temperature between 80° C. and the boiling point of the solution. Even though it is possible by this process to remove most of the Cd from the mother liquor, the high pH results in precipitation of valuable components too. This requires special ways of carrying out filtering and make-up stages in order to make the process economical.

There are also known several processes for removal of heavy metals like Cd by liquid—liquid extraction. It has been especially difficult to make such processes feasible when the phosphoric acid solution contains nitric acid. Up to now the extraction processes have not been found very suitable technically and economically for treatment of such large amounts of solutions which one had to deal with in fertilizer processes. One type of extraction process is described in patent application EP-91043. This process relates to removal of heavy metals like Cd, Hg and Pb from crude phosphoric acid (mother liquor) made by digestion of rock phosphate with nitric acid and subsequent removal of calcium nitrate. The crude phosphoric acid is purified and neutralized with ammonia to pH 0.5-1.5, whereupon it is contacted with a di-organyl-dithio phosphoric acid compound and an absorption agent, for instance active carbon. The heavy metals are thereby bound to the di-thio phosphoric acid compound which is adsorbed to the active carbon and removed therewith from the phosphoric acid solution. This process comprises high running costs, for instance because of costly chemicals and adsorbent. Regeneration of the adsorbent will, if possible, be expensive, and the alternative is to deposit large amount of refuse.

The object of the present invention was to remove heavy metals, especially Cd, in a technically and economically advantageous way from phosphoric acid containing solutions, especially solutions made by digestion of rock phosphate with nitric acid.

Having tested several of the known methods for removing heavy metals from phosphoric acid containing solutions, the inventors found that it was necessary to look for new methods. During this preliminary work one found that application of extraction agents would create several problems and therefore one decided to continue the study of precipitation processes. The problems related to the latter processes are usually large precipitates which also contain valuable components, and separation of the precipitates from the phosphoric acid solution. Several chemicals were studied which in this environment possibly could bind heavy metals, and then preferably form minor amounts of precipitates which in addition were easy to separate from the phosphoric acid solution. In connection with these studies one found described in the literature (Chemical Abstract 76 131-189 k) that methyl, butyl or amyl xanthate could be used for selective removal of cadmium from drain water which contains large amounts of Zn or Fe. Even though the conditions were different, for instance pH 4-6, the statement about 90% precipitation of Cd was so interesting that one decided to investigate the effect of such chemicals on a phosphoric acid containing solution.

Precipitation at pH 4-6 was not found to be practical because large amounts of precipitates of different phosphates then would occur. The question was therefore whether Cd could be precipitated at such acid conditions which were necessary for avoiding precipitation of phosphate. Several preliminary tests were carried out with addition of xanthate to the mother liquor from a nitrophosphate process in which the pH was varied, i.e. the mother liquor was partly neutralized with ammonia. It was soon found that free nitric acid in the mother liquor represented a problem as it reacted with xanthate resulting in formation of nitrous gases. This phenomena was most pronounced when unneutralized mother liquor was used. In the following text the pH is stated as measured in the solution diluted with water on a volume basis of 1:13. The pH in the solution was gradually increased by addition of ammonia and when alkali metal xanthate was added one found that substantial amounts of the present Cd were precipitated as Cd-xanthate. It was further found that other metal contaminants like Fe, Ni, Hg and Pb were precipitated and that the xanthate did not remove Cd selectively as stated in the above literature reference. This phenomena had to be kept in mind when calculating the necessary amounts of xanthate with regard to other metal contaminants which could possibly be bound to the xanthate. During the further tests therefore xanthate was added in surplus. It was found that by using the same amount of xanthate the precipitation of Cd increased with increasing pH. It was possible to precipitate Cd at pH 1.4-2.0 from phosphoric acid containing solutions, and also those made by the nitrophosphate process.

During the above tests it seemed that the temperature during precipitation influenced the results and this was further investigated. It was then found that the precipitation was strongly related to the temperature as the precipitation of Cd increased with decreasing precipitation temperature. Thus the necessary amount of xanthate for precipitating the same amount of Cd was reduced by 50% when the precipitation temperature was lowered from 40° C. to 20° C. How low the precipitation temperature should be, was partly a question of energy economics. It was found, all considered, that the precipitation should be carried out at 5°–40° C., preferably 10°–20° C.

Based on the positive results from these preliminary tests the inventors found that the type of precipitating agent had to be further investigated.

It seemed that the xanthate (X) acts as an ion exchanger in the respect that the metal (potassium or sodium) is dissolved, while the heavy metal xanthate is precipitated.

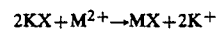

$$2KX + M^{2+} \rightarrow MX + 2K^+$$

(KX is potassium xanthate and $M^{2+}$ is heavy metal, for instance Cd.)

It was further found that some xanthates are more unstable than others in the acid solutions in question, and one could also get side reactions with for instance formation of $CS_2$. The stability of the xanthate was found to increase with the amount and degree of branching of the organic part. Regarding choice of xanthate it was further found that alkali salts like sodium and potassium salts were most suitable, while other water soluble metal salts of xanthate could be applied.

Xanthates are salts of dithio carbonic acid-O-esters and have the general formula:

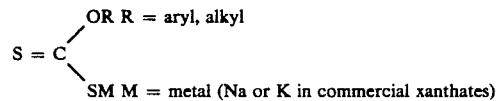

R can have 1–8 C atoms, and preferred xanthates were potassium hexyl xanthate (PHX), potassium amyl xanthate (PAX) and sodium iso-butyl xanthate (SIBX).

It was found during the further tests that the phosphoric acid solution should be pre-purified with regard to sludge and insoluble components. This pre-purification can be carried out in conventional ways, for instance by decantation, with or without addition of floculants, and subsequent separation, for instance by decantation of the solution from the precipitate.

Separation of precipitated heavy metals can be carried out in several ways known per se, like filtration, possibly combined with flotation. Heavy metal xanthate has been found to be very suitable for flotation separation due to its hydrophobic properties.

The special features of the invention are as defined in the attached patent claims. They comprise pre-purification of the phosphoric acid solution for removal of sludge and insolubles before neutralization with ammonia to pH 1.4–2 and cooling to 5°–40° C. Metal salts of dithio carbonic acid-O-esters are added for precipitating the heavy metals and then the precipitate is separated from the solution.

The solution is preferably neutralized to pH 1.6–1.8 and cooled to 10°–20° C. before precipitation of the heavy metals with for instance sodium or potassium salt of a butyl xanthate. The heavy metal precipitate can be removed from the phosphoric acid solution by flotation and subsequent filtration.

The invention will be further explained in the following description of the flow-sheet and by the examples.

FIG. 1 Flow-sheet for removal of heavy metals according to the invention.

This FIGURE shows a flow-sheet for removal of heavy metals from a phosphoric acid solution 1 which can be mother liquor made by digestion of rock phosphate with nitric acid and subsequent removal of calcium nitrate from the mother liquor.

The solution 1 is transported to a clarifying vessel 3, possibly together with floculating agents 2. The contaminated phosphoric acid solution 4 is transported to neutralization vessel 6, to which ammonia is added through pipe 5. Precipitated sludge 13 from vessel 3 can be removed as such from the process or mixed with purified phosphoric acid solution via pipe 14. Subsequent to partial neutralization to pH 1.4–2.0 in vessel 6 at about 120° C., the solution is cooled in a heat exchanger 7 to 5°–40° C. and then transported to the precipitating vessel 8, to which precipitating agent is added through pipe 9. The heavy metal precipitate 15 is separated from the solution in stage 10 and the heavy metal precipitate is transported to means (not shown) for recovery or deposit. Purified phosphoric acid solution is transported through pipe 11 for further processing like neutralization, possible addition of potassium salt and particulation. Part of the purified mother liquor can be returned to the clarification vessel 3 via pipe 12.

EXAMPLE 1

This example shows the method according to the invention applied on mother liquor from the nitrophosphate process and the effect of pH during partial neutralization.

Rock phosphate containing 0.060 kg Cd/ton was digested by nitric acid as known per se and cooled to about 10° C. for precipitation of calcium nitrate which then was removed by filtration. Thus produced mother liquor was transported to a clarification vessel and polyelectrolyte was added for increasing the clarification and agglomeration of sludge. This mother liquor which contained 23 ppm Cd and was removed at the upper part of the clarification vessel was partly neutralized with ammonia. Part of this mother liquor was neutralized to pH 1.0, 1.2, 1.4, 1.6 and 1.8. Then the mother liquor was cooled to about 20° C. Sodium iso-butyl xanthate (SIBX) was then added to the cooled mother liquor in amounts of 1.6 kg/ton phosphate. The xanthate was added as an aqueous solution but can also be added in solid form. After a reaction time of 10 minutes precipitated xanthate was filtered off. The precipitate was found to constitute about the same amounts as the xanthate added, i.e. about 2 parts per thousand (in weight).

The results of the tests are stated in Table 1.

TABLE 1

| ppm Cd before precipitation | ppm Cd after precipitation | pH |
|---|---|---|
| 23 | 22 | 1.0 |
| 23 | 22 | 1.2 |
| 23 | 4.2 | 1.4 |
| 23 | <0.2 | 1.6 |
| 23 | <0.1 | 1.8 |

As can be seen from Table 1, the mother liquor must be cooled to 20° C. and neutralized to pH 1.4 before Cd is precipitated. At pH above 1.6 the Cd content is reduced in purified mother liquor by more than 95%. The sludge which is removed during the pre-purification, contained 20% of the initial Cd content of the rock phosphate.

EXAMPLE 2

This example shows the effect of the temperature during the precipitation. Mother liquor was pre-neutralized to pH 1.8 and reaction time in the precipitating vessel was 10 minutes. The amount of xanthate (SIBX) was varied such as shown in the Table below, which shows the Cd content in the mother liquor before and after purification.

TABLE 2

| ppm Cd before precipitation | ppm Cd after precipitation | Precipitation temperature °C. | SIBX consump. (kg/t phosphate) |
|---|---|---|---|
| 20 | 1.8 | 20 | 0.8 |
| 20 | 0.8 | 20 | 1.6 |
| 20 | 16.0 | 40 | 0.8 |
| 20 | 2.0 | 40 | 1.6 |
| 20 | 17.0 | 60 | 0.8 |
| 20 | 12.0 | 60 | 1.6 |
| 20 | 9.0 | 20 | 0.8 |
| 20 | 4.0 | 10 | 1.6 |
| 20 | 4.7 | 20 | 1.6 |
| 20 | 1.6 | 10 | 1.6 |

EXAMPLE 3

This shows the effect of the type of xanthate where the length/branching of the organic part is varied. The tests were carried as in Example 1 with partial neutralization to pH 1.6.

TABLE 3

| Xanthate | ppm Cd before precipitation | ppm Cd in mother liquor after precipitation/filtration |
|---|---|---|
| PHX | 17.0 | 1.7 |
| PAX | 17.0 | 1.8 |
| SIBX | 17.0 | 1.0 |
| SEX | 17.0 | 11.4 |
| SIX | 17.0 | 15.3 |
| SSBX | 17.0 | 16.0 |

The xanthates used were: potassium hexyl xanthate (PHX), potassium amyl xanthate (PAX), potassium iso-butyl xanthate (SIBX), sodium ethyl xanthate (SEX), sodium iso-propyl xanthate (SIX), sodium sec-butyl xanthate (SSBX).

As can be seen from Table 3, it was the xanthate having the longest and most branched organic part which gave the best results with regard to removal of Cd.

EXAMPLE 4

This example shows application of the invention for purifying wet process phosphoric acid made by digestion of rock phosphate with sulfuric acid. The phosphoric acid which contained 3.7 ppm Cd, was neutralized with ammonia to pH=2.0 and then 2 g SIBX/kg phoshporic acid was added at 20° C. After filtration of precipitated metal xanthate the phosphoric acid acid contained 0.3 ppm Cd, i.e. about 92% reduction of the Cd content.

As can be seen from the examples it is possible by the present method to remove substantial amounts of Cd from phosphoric acid containing solutions. From pre-purified solution at least 90% of the Cd content is removed in the form of relatively small amounts of precipitate which in addition does not contain any of the solution's valuable components. As only a small part of the rock phosphate's Cd content (about 20%) is removed by the sludge during the pre-purification, a Cd concentrate is obtained by the precipitation which totally comprises about 75% of the initial Cd content of the rock phosphate. Further, heavy metal contaminants in the rock phosphate are simultaneously removed, for instance Hg and Pb and some iron. The amount of the precipitate is that small that it can be deposited, but it is also suitable for further processing. Compared with other Cd removal processes the method comprises small changes of the total fertilizers and the extra use of chemicals does not result in large costs. Regarding separation of the precipitate from the acid solution, one has several degrees of freedom and can apply a known technique comprising flotation. The invention is especially useful for purifying mother liquor made by the nitrophosphate processes, and it is in fact this one which has constituted the largest problems with regard to removal of Cd.

I claim:

1. A method for removing heavy metals from a phosphoric acid-containing solution, which comprises neutralizing the solution to pH 1.4–2.0, cooling the solution to 5°–40° C. adding a metal salt of a dithio carbonic acid-O-ester to the solution to precipitate the heavy metals, and separating the precipitate from the solution.

2. The method according to claim 5, wherein the heavy metals include cadmium.

3. The method according to claim 5, wherein the phosphoric acid-containing solution is a solution obtained by digestion of rock phosphate with nitric acid and subsequent removal of a majority of calcium from the resultant mother liquor, and wherein the resultant phosphoric acid solution is pre-purified for removal of sludge and insoluble components and thereupon partly neutralized with ammonia.

4. The method according to claim 1, wherein the solution is neutralized to pH 1.6–1.8 and cooled to 10°–20° C. before precipitation of the heavy metals.

5. The method according to claim 1, wherein the heavy metals are precipitated by a sodium or potassium salt of a butyl xanthate.

6. The method according to claim 1, wherein the precipitate is removed from the solution by flotation and subsequent filtration.

* * * * *